United States Patent [19]
Chi

[11] Patent Number: 6,006,329
[45] Date of Patent: Dec. 21, 1999

[54] DETECTION OF COMPUTER VIRUSES SPANNING MULTIPLE DATA STREAMS

[75] Inventor: Darren Chi, Alhambra, Calif.

[73] Assignee: Symantec Corporation, Cupertino, Calif.

[21] Appl. No.: 08/909,203

[22] Filed: Aug. 11, 1997

[51] Int. Cl.$^6$ .............................. G06F 12/14; G06F 11/00
[52] U.S. Cl. .............................................. 713/200; 714/38
[58] Field of Search ................................ 713/200; 714/38

[56] References Cited

U.S. PATENT DOCUMENTS 5,452,442  9/1995  Kephart .............................. 395/183.14

OTHER PUBLICATIONS

Vesselin Bontchev, "Possible macro virus attacks and how to prevent them", Computers & Security, pp. 595–626, Dec. 1996.

Primary Examiner—Robert W. Beausoliel, Jr.
Assistant Examiner—Brian H. Shaw
Attorney, Agent, or Firm—Fenwick & West LLP

[57] ABSTRACT

A computer system (100) and method detect computer viruses spanning multiple data streams. A virus signature is written in the form of a Boolean expression, where the operands of the Boolean expression are signatures of components of the virus. A processor (110) identifies data streams to be scanned and scans the identified data streams for components of viruses. Using the scan results, the processor (110) then evaluates the virus signatures, and, for any Boolean expression satisfied, the processor (110) determines that the virus corresponding to the expression exists in the scanned data streams.

18 Claims, 9 Drawing Sheets

```
        ┌───┐
        │ B │
        └─┬─┘
          ▼
    ╱╲
   ╱  ╲
  ╱ Is the probability low that ╲      Y      ┌─────────────────────┐
 ╱  the combination will exist   ╲────────────▶│ Use the signature   │
 ╲  without the virus existing?  ╱             │ for the combination │
  ╲            245              ╱              │ as the signature for│
   ╲                           ╱               │  the entire virus.  │
    ╲                         ╱                │         250         │
     ╲                       ╱                 └─────────────────────┘
      ╲   N
       ▼
┌─────────────────────┐
│    Expand the       │
│  combination to     │
│   include more      │
│ components of the   │
│  virus until the    │
│  probability is low │
│ that the expanded   │
│   combination will  │
│  exist without the  │
│   virus existing.   │
│         255         │
└──────────┬──────────┘
           ▼
       ╭───────╮
       │  End  │
       ╰───────╯
```

Figure 2c

DETECTION OF COMPUTER VIRUSES SPANNING MULTIPLE DATA STREAMS

BACKGROUND OF THE INVENTION

1. Field of the Invention

This invention relates generally to computer virus detection, and, more specifically, to a system and method for detecting computer viruses that span multiple data streams.

2. Description of the Prior Art

Computer viruses attach themselves to data streams. Examples of data streams include executable program files, data files, and boot sectors, such as those on floppy and hard disks. A virus replicates when the data stream to which it is attached is accessed, allowing the virus to infect additional data streams. Such infections can severely damage a computer system. Consequently, many virus detection programs have been developed to detect viruses.

To detect viruses, known virus detection technologies develop a signature for each known virus. Each data stream to be scanned for viruses is then examined to determine whether the data stream contains a known virus signature. If a virus signature is found in a data stream, the virus detection technology will conclude that the virus corresponding to the found signature exists in that data stream.

Traditionally, the entire body of a virus has been wholly contained within one data stream. As a result, current virus detection technologies scan each data stream for an entire virus signature and examine each data stream for viruses independently of other data streams.

Recently developed operating systems and file formats include data entities that are a collection of data streams. Examples of these entities are Apple Macintosh files that consist of code and resource forks, Microsoft Windows executable files that consist of multiple code and data sections, and Microsoft Word or Excel documents that are stored as a collection of data streams in an OLE 2 compound storage file. Although physically these examples are single files, logically they comprise two or more data streams.

Since these various entities can comprise two or more data streams, viruses have been developed that have components spread out over several data streams. Consequently, known virus detection techniques, which examine each data stream independently of the other data streams, will often fail to correctly identify a virus whose components span multiple data streams.

For instance, known virus detection technologies will often fail to correctly identify Microsoft Word macro viruses. Macro viruses are composed of one or more macros, with each macro residing in a separate data stream.

Consider a macro virus consisting of two macros. One of the macros, call it A, includes the code that performs the replication. The other macro, call it P1, is the payload of the virus. If the virus A/P1 was the only one including either macro A or macro P1, then the virus A/P1 can be detected and identified by just detecting the signature for either macro A or macro P1. In this situation, where A/P1 can be uniquely identified by one of its components, the signature for A/P1 can be just the signature for one of its components. If the signature for A/P1 is just the signature for one of its components, current virus detection methods may be sufficient, assuming the whole of the component is found in a single data stream.

Consider a new macro virus that is also comprised of a macro A, but has a different payload macro, call it P2. This situation may arise when a virus writer decides to copy an existing virus to reduce extra work and then modifies the payload of the virus. Now, simply detecting the signature for macro A is insufficient because the signature does not differentiate the two viruses. However, it would be sufficient to have signatures just for the payloads, P1 and P2, since each of the viruses has a different payload. In other words, if one signature is developed for macro P1 and if one is developed for macro P2, the two viruses can be detected and differentiated from one another. In this case, known virus detection methods may also be sufficient.

If a virus writer creates virus B/P1, viruses A/P1, A/P2, and B/P1 will exist. Now, neither the signature for macro A nor the signature for macro P1 alone uniquely identifies virus A/P1. The virus can be uniquely identified only by the combination of the signatures for macros A and P1. However, since macro A may exist in a different data stream than macro P1, known virus detection systems that operate only in the context of a single data stream are insufficient to uniquely identify virus A/P1.

To further illustrate the point, assume the virus writer decides to combine viruses A/P1 and A/P2 so that this newly created virus, call it A/P1/P2, comprises macro A and the two payloads P1 and P2. None of A/P1, A/P2, and A/P1/P2 can be uniquely identified by only one of their components. They can be identified only by a combination of components, and therefore, if the components of each virus are spread out over multiple data streams, it is not possible to detect these viruses by known detection means that scan data streams independently of each other. Thus, it is desirable to have a virus detection technology that can detect and correctly identify viruses whose components span multiple data streams.

SUMMARY OF THE INVENTION

The present invention is a computer system and method for detecting computer viruses. To detect a virus, a signature is created for the virus. A virus signature is created by dividing a computer virus into components, where a component exists entirely in one data stream. The virus signature is then written in the form of a Boolean expression, where signatures of the components are used as operands of the Boolean expression. A processor (110) of the computer system (100) identifies data streams to be scanned and scans the data streams for components of the virus. Using the scan results, the processor (110) evaluates the Boolean expression, and, if the Boolean expression is satisfied, the processor (110) determines that the virus exists. If the Boolean expression is not satisfied, the processor (110) determines that the virus does not exist.

BRIEF DESCRIPTION OF THE DRAWINGS

These and other more detailed and specific objects and features of the present invention are more fully disclosed in the following specification, reference being had to the accompanying drawings, in which:

FIGS. 2a–2c illustrate a method according to the present invention for creating a virus signature.

DETAILED DESCRIPTION OF THE PREFERRED EMBODIMENTS

Figure 1:
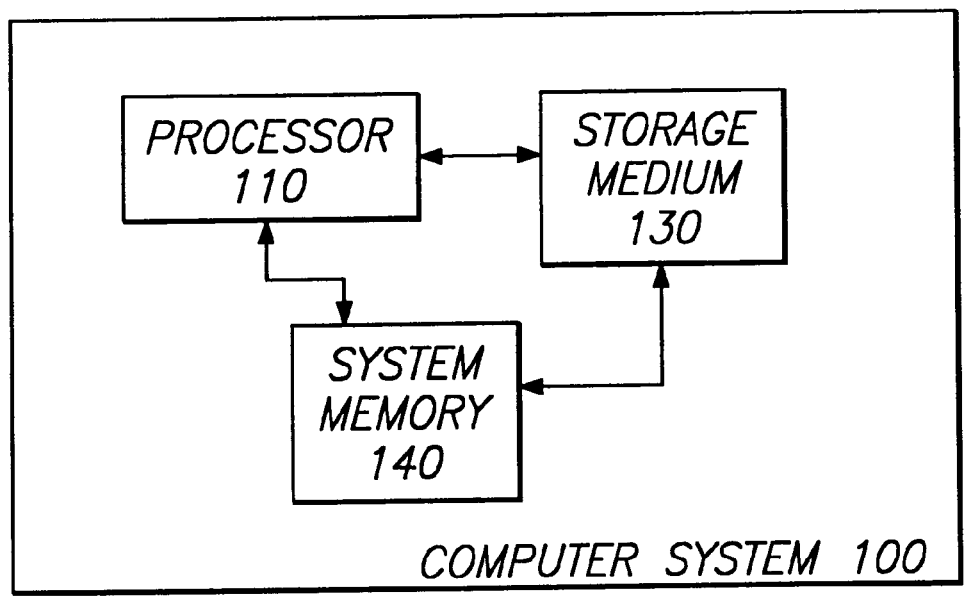
FIG. 1 illustrates a computer system 100 according to the present invention.

FIG. 1 illustrates components of a computer system 100 used in accordance with the present invention, where the computer system includes a processor 110, a storage medium 130, and a system memory 140. The processor 110 may be any conventional processor, such as the PENTIUM processor manufactured by Intel Corporation. The storage medium 130 and system memory 140 are also conventional, and the storage medium 130 may be the hard drive of the computer system 100.

The processor 110 receives requests from applications executing on the computer system 100 to scan files for computer viruses (hereinafter referred to as "viruses"). The files are comprised of data streams, which the processor 110 scans. When the processor 110 receives a request to scan files for viruses, it sends a request to the storage medium 130 to retrieve the data streams associated with the files that are to be scanned. The retrieved data streams are then written into the system memory 140. The processor 110 then scans the requested data stream in the system memory 140 for viruses.

Since viruses can span multiple data streams, a single data stream may include only one component of a particular virus. Consequently, the virus detection method of the present invention creates virus signatures that represent a component or a combination of components of a virus, where each component represents a different characteristic of a virus. The data streams are then scanned for the components of virus as opposed to the whole virus. In the case of a macro virus, a virus signature for the macro virus could be divided up into components, where each component of the signature represents a different macro of the virus.

Consider A/P1, A/P2, B/P1 and A/P1/P2, the four viruses discussed in the "Background of the Invention" section. Assuming each component resides in a different data stream, each of the first three viruses spans two data streams and the fourth virus spans three data streams. Scanning each data stream independently of other data streams for the entire virus signature of any of these viruses will not result in any of the viruses being detected. This is because none of these viruses exists entirely in one data stream. Therefore, in order to detect the viruses, each data stream is scanned only for components of a virus.

If only viruses A/P1 and A/P2 are present, it is sufficient to have the following two signatures for detecting these viruses:

| Virus | Signature |
|---|---|
| A/P1 | Component Sig/P1 |
| A/P2 | Component Sig/P2 |

The signature Component Sig/P1 is the signature for the component P1 of the virus A/P1, and the signature Component Sig/P2 is the signature for component P2 of the virus A/P2. In this case, the signature of component P1 suffices for the whole signature of virus A/P1, and the signature of component P2 suffices for the whole signature of virus A/P2. This is because components P1 and P2 are unique to viruses A/P1 and A/P2, respectively (this also assumes that, if P1 and P2 exist, the viruses A/P1 and A/P2 exist). The signature creation method will be discussed in further detail with respect to FIG. 2. Note that a signature merely representing component A of either virus would not distinguish between the two viruses.

If virus B/P1 appears, it is necessary to modify the signature for virus A/P1. Component Sig/P1 is no longer sufficient to uniquely identify virus A/P1 because it also identifies virus B/P1. However, virus A/P1 can be uniquely identified by both the signature for component A and the signature for component P1. Therefore, the signatures that uniquely identify the three viruses are as follows:

| Virus | Signature |
|---|---|
| A/P1 | Component Sig/A and Component Sig/P1 |
| A/P2 | Component Sig/P2 |
| B/P1 | Component Sig/B |

The "and" in the signature for virus A/P1 is a Boolean AND, which means that both component A and component P1 must be detected in the scanned data streams in order for the virus to be detected.

If virus A/P1/P2 appears, the following signatures are used:

| Virus | Signature |
|---|---|
| A/P1 | Component Sig/A and Component Sig/P1 and (not Component Sig/P2) |
| A/P2 | Component Sig/A and Component Sig/P2 and (not Component Sig/P1) |
| B/P1 | Component Sig/B |
| A/P1/P2 | Component Sig/A and Component Sig/P1 and Component Sig/P2 |

The "not" in the signatures for A/P1 and A/P2 is a Boolean NOT. Virus A/P1 does not have payload P2, and virus A/P2 does not have payload P1. Virus A/P1/P2 does have both payloads, and, therefore, the Boolean NOT expression in the signatures for viruses A/P1 and A/P2 are necessary to differentiate viruses A/P1 and A/P2 from virus A/P1/P2.

Boolean OR may also be used in a signature. Boolean OR is used when a virus can take on alternate forms. For instance, a computer virus may be created to cause the word "Hello" to appear on a computer screen at some times and cause the word "Bye" to appear on the screen at other times.

In one embodiment of the invention, Boolean NOT has precedence over Boolean AND, and Boolean AND has precedence over Boolean OR. However, other methods, such as placing parentheses in the equation, may be used to indicate the order of operations.

Figure 2A:
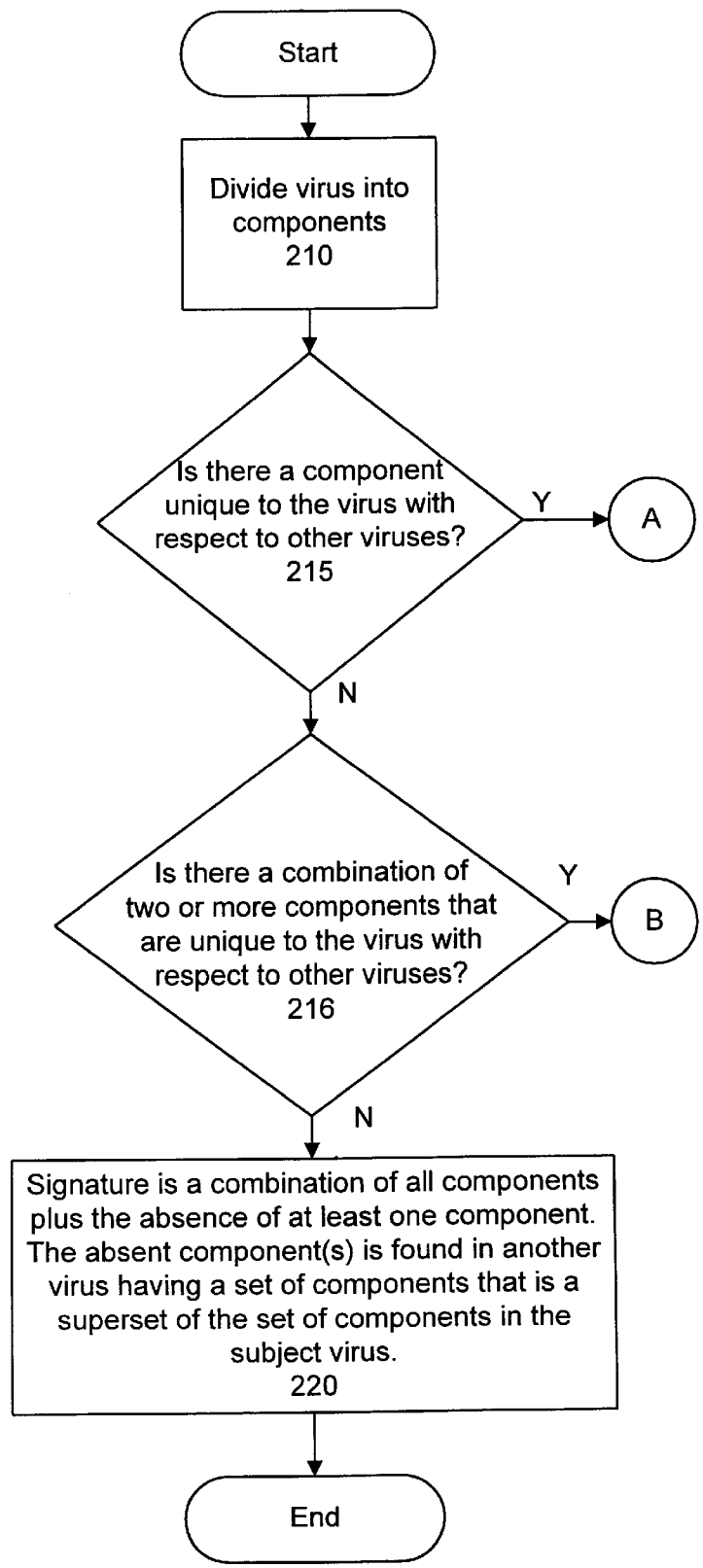
Figure 2B:
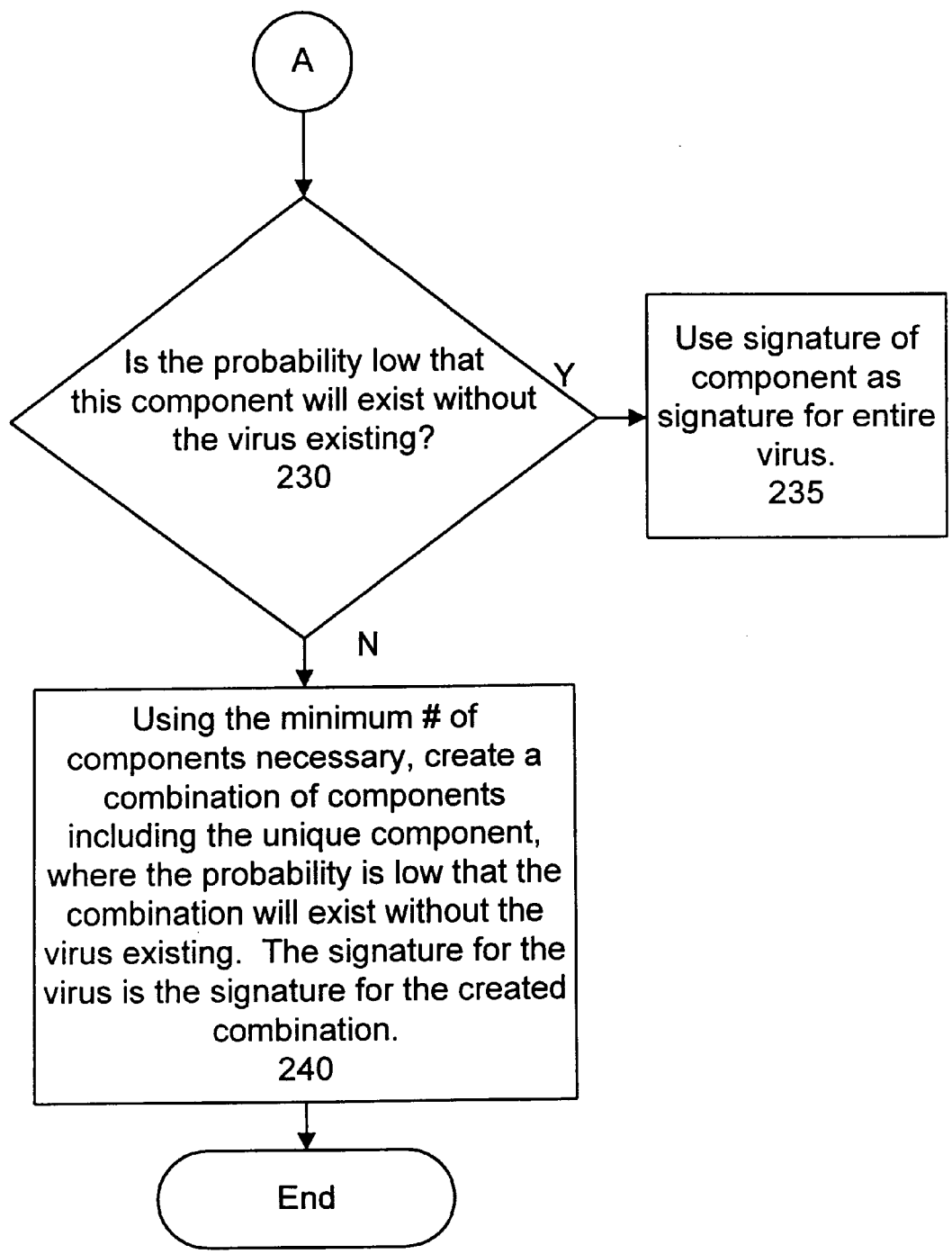

FIG. 2 illustrates a method for creating virus signatures according to the present invention. In the preferred embodiment, the signature creation method is performed by a human. However, in another embodiment, the method is embodied in a computer program, and a computer executes the computer program to implement the method.

To create a signature for a virus, the virus is divided 210 into components, where a single component exists entirely in one data stream. For a macro virus, the virus may be divided into its individual macros. For instance, the macro virus B/P1 may be divided into two parts: B and P1.

After the virus is divided into components, the signature creator (which may be a human or a computer) determines 215 whether the virus has a component that is unique to the virus with respect to other viruses. In the above example, the component B is unique to the virus B/P1 with respect to the other three viruses.

If there is not a component unique to the virus with respect to other viruses, the signature creator determines 216 whether there is a combination of two or more components that is unique to the virus with respect to other viruses. For instance, in the above example, the combination P1/P2 is unique to the virus A/P1/P2 because no other virus has both P1 and P2.

If there is not a combination of two or more components that is unique to the virus, the signature for the virus, which is logically in the form of a Boolean expression, is then a combination of all the components plus the absence of at least one component (step 220). The absent component is found in another virus having a set of components that is a superset of the set of components in the subject virus. For example, in the above example the virus A/P1 does not have any component or any combination of components that is unique to it. Therefore, the signature for the virus A/P1 indicates the presence of components A and P1 plus the absence of component P2, and the signature may be written as follows: Component Sig/A and Component Sig/P1 and not (Component Sig/P2). Component P2 was chosen as the absent component because it is found in the virus A/P1/P2, and the set {A, P1, P2} is a superset of the set {A, P1}. In the preferred embodiment, the minimum number of components is used to create a signature. Thus, if the absence of several components can be indicated in a signature, the signature indicates the absence of the least number of components necessary to uniquely identify the virus with high probability. For example, if the virus A/P1/P2/P3 exists, the signature for virus A/P1 will indicate only the absence of either P2 or P3, but not both, providing indicating the absence of only one is sufficient to uniquely identify the virus.

Referring back to step 215, if a component unique to the virus exists, the signature creator determines 230 if the probability is low that the unique component will exist in the data streams without the virus being present. If the probability is low, then the signature of the entire virus is the signature of the unique component of the virus (step 235). Otherwise, signatures of other components in the virus are added 240 to the signature of the virus, which is logically in the form of a Boolean expression. In the preferred embodiment, the signature indicates the least number of components necessary. Therefore, signatures of components are added until the probability is low that the combination of the unique component and the added components will exist without the virus existing. With the example virus B/P1, the component B is unique, with respect to the other viruses, to the virus B/P1. Therefore, if the probability is low that the component B will be found in scanned data streams without the virus B/P1 contaminating the data streams, the signature for the virus B/P1 is the signature for component B (Component Sig/B). If the probability is not low that component B will exist without the virus existing, the signature of the virus will be the combination of the signature for B and the signature for P1 (Component Sig/B and Component Sig/P1).

Referring back to step 216, if there is a combination of two or more components that is unique to the virus, the signature creator determines 245 whether the probability is low that the combination will exist in data streams without the virus existing. If the probability is low, the signature for the combination, which is logically in the form of a Boolean expression, is used as the signature for the whole virus (step 250). For instance, with respect to virus A/P1/P2, the combination P1 and P2 is unique, and if the probability is low that both P1 and P2 will exist without the virus A/P1/P2 existing, the signature for A/P1/P2 will be the combination of signatures for P1 and P2 (Component Sig/P1 and Component Sig/P2).

If the probability is not low, the virus signature is expanded to include not only the unique combination, but additional components of the virus (step 255). With respect to the above example, if the probability is not low that P1 and P2 will exist without the virus A/P1/P2 existing, the signature this virus will be expanded to include the signature of component A. (i.e. Component Sig/A and Component Sig/P1 and Component Sig/P2). The signature is expanded until the probability is low that the expanded combination will exist without the virus existing.

The virus signatures created in accordance with the method described above are expressed in the form of a Boolean expression. The operands of the Boolean expression are the signatures of the virus components. For instance, Component Sig/P1 is an operand of the signature Component Sig/A and Component Sig/P1 and Component Sig/P2. The operators of the Boolean expression are Boolean operators, such as OR, AND, or NOT, that specify the way in which the operands are combined to create a virus signature.

The signatures of components of viruses are written the same way conventional signatures for whole viruses are written. The signatures of components may be cyclic redundancy checks, scan strings, algorithmic scan signatures, and profile signatures.

Figure 3A:
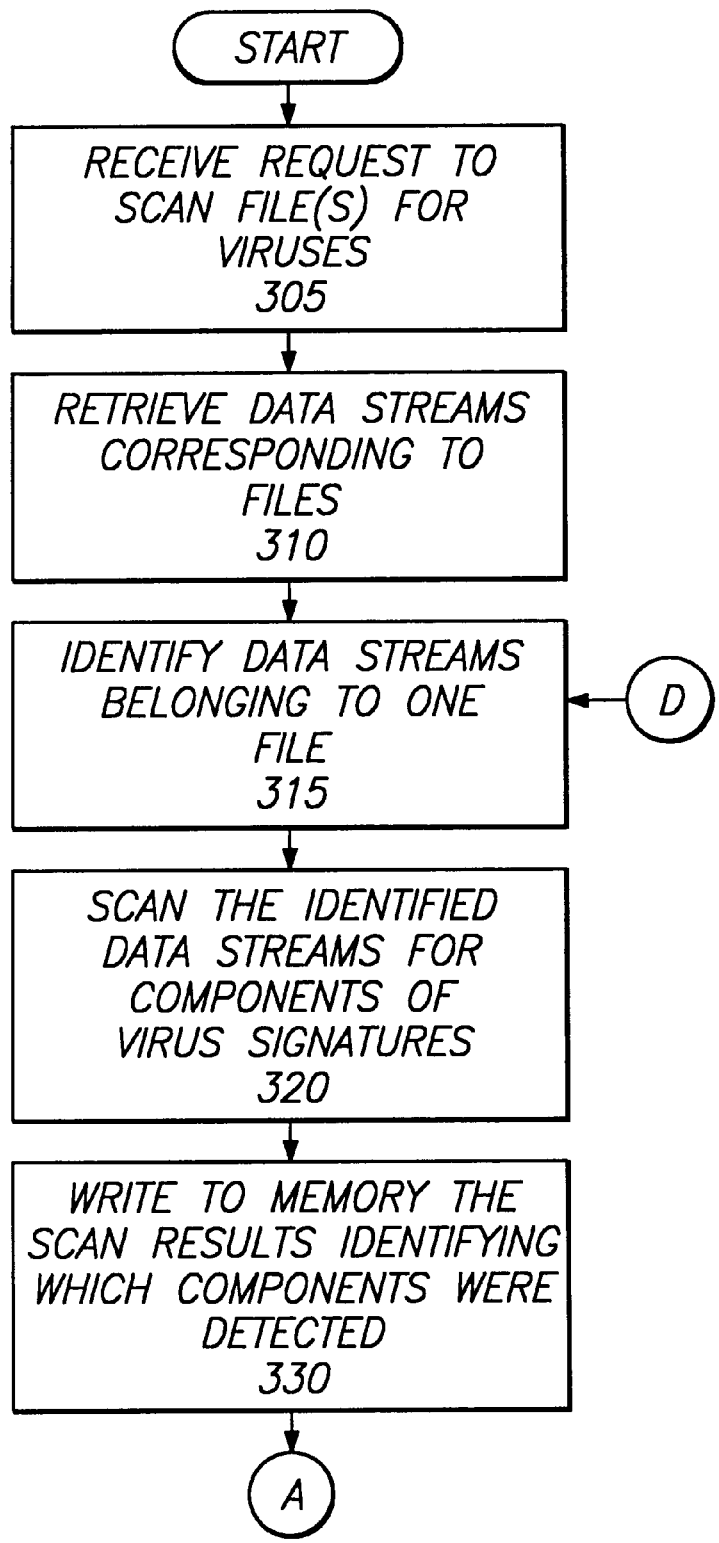
FIGS. 3a–3c illustrate a method according to the present invention for detecting computer viruses.
Figure 3B:
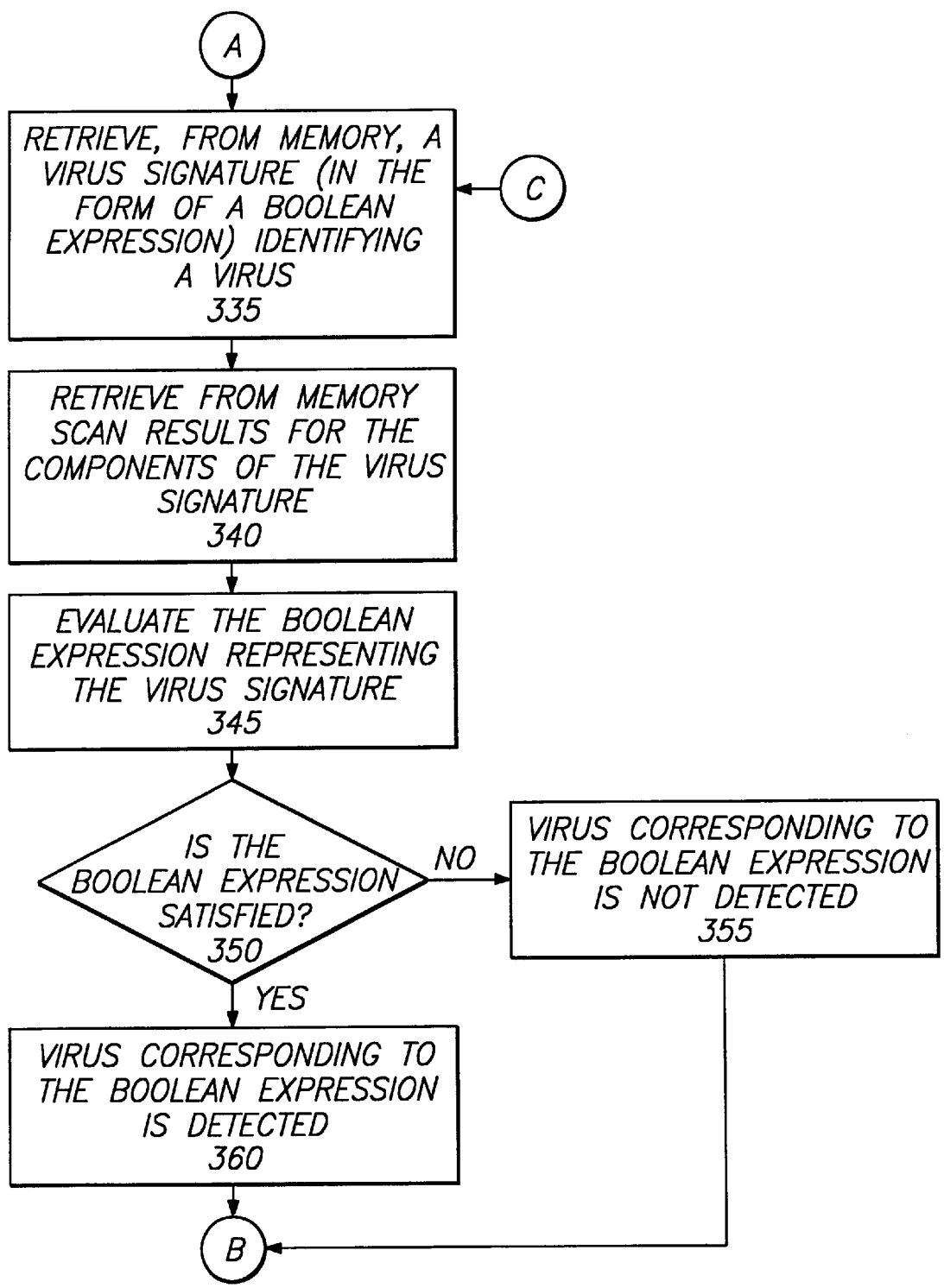
Figure 3C:
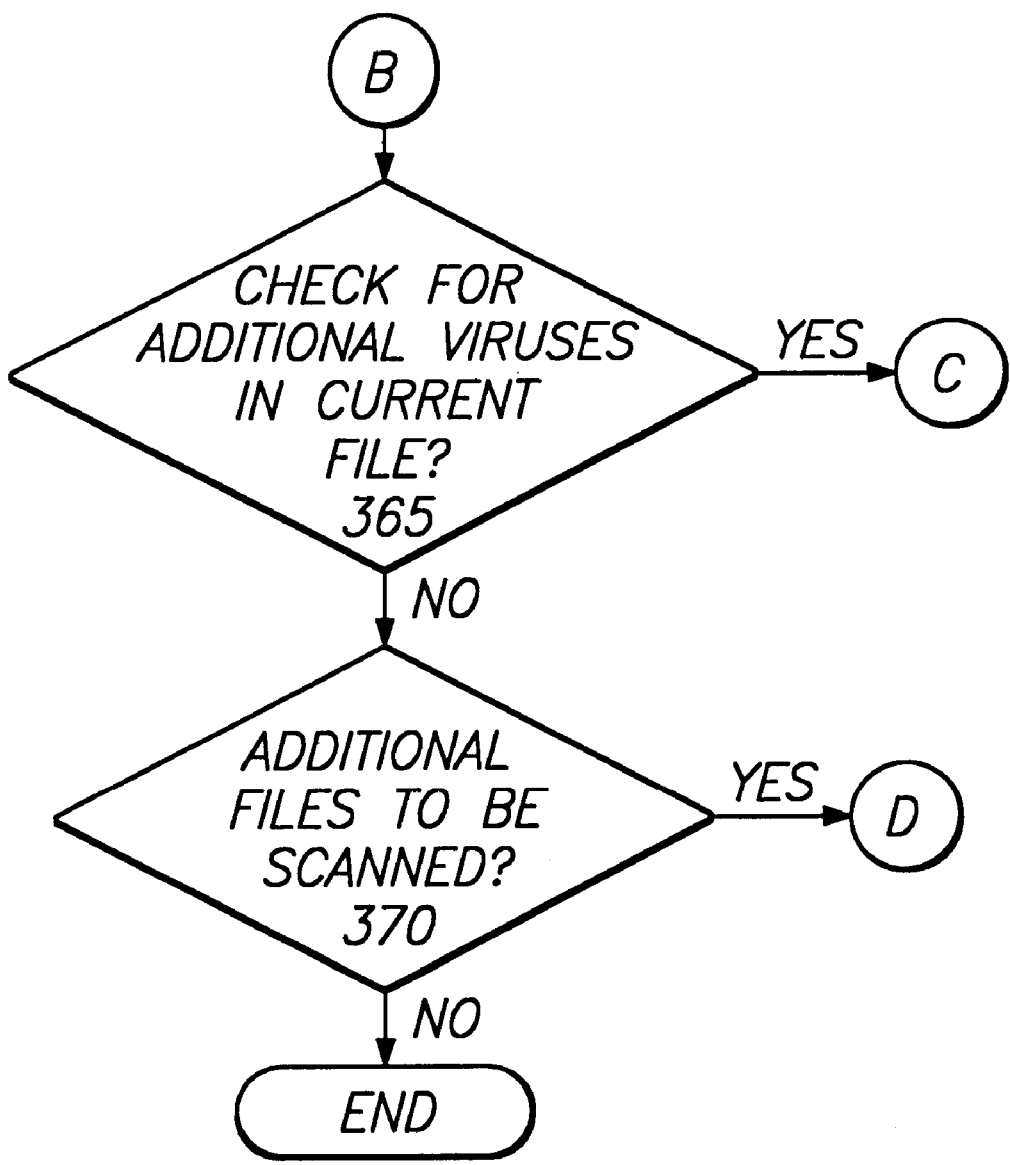

FIG. 3 illustrates the method of the present invention for detecting computer viruses. The processor 110 receives 305 a request from an application executing on the computer system 100 to scan select files for viruses. In one embodiment, the files are physical files stored on the hard drive of a computer. The files comprise data streams, and the processor 110 has the data streams which comprise the select files retrieved 310 from the storage medium 130 and stored in the system memory 140. The processor 110 then identifies 315 the data streams that belong to one file, and scans 320 the identified data streams for components of virus signatures. Specifically, for each virus signature, the processor 110 scans the data streams for the operand(s) of the Boolean expression that represents the virus signature. An operand of such a Boolean expression is the signature of a component of the virus (e.g., Component Sig/A).

In the preferred embodiment, a separate virus scan is done for each file, but, in an alternate embodiment, one scan could be done for the data streams belonging to several files. Additionally, the data streams of one file could be divided up into several groups and scanned by group.

Conventional virus scanning methods are used to scan the data streams for components of virus signatures. The processor 110 scans for a component of a virus signature the same way it would scan for an entire virus signature.

After the scan is completed, the scan results are stored 330 in system memory 140. The information stored indicates which virus components were detected in the scan and which were not.

Virus signatures are stored in system memory 140. After the data streams have been scanned, the processor 110 retrieves 335 one of the virus signatures from the system memory 140. The processor 110 also retrieves 340 from system memory 140 the scan results for the components in the retrieved virus signature. As discussed above, the virus signature is in the form of a Boolean expression, and, using the scan results, the Boolean expression is evaluated 345. If the processor 110 determines 350 that the Boolean expression is satisfied, the processor 110 concludes 360 that the virus corresponding to the expression exists in the scanned data streams. If the Boolean expression is not satisfied, the processor 110 concludes 355 that the virus corresponding to the Boolean expression does not exist in the scanned data streams.

The processor 110 then determines 365 whether the scanned data streams need to be checked for other viruses. If so, the processor 110 retrieves another signature from memory and repeats the process from step 335.

In response to the scanned data streams (which correspond to one file) not needing to be checked for other viruses, the processor 110 determines 370 whether there are other files identified in step 315 that need to be scanned. If so, the processor 110 identifies data streams belonging to another one of the files and repeats the above-described process from step 315. If not, the virus scan is completed.

The virus signatures of the above example are written in a form known as "infix." However, in the preferred embodiment, the virus signatures are stored in system memory 140 and processed by the processor 110 in a form known as postfix.

The following is an example of an expression in infix form:

(A<and>B) <or> (C<and> (<not> D))<end>

A,B,C, and D, the operands of the expression, are the signatures of components. <and>, <or>, and <not> are Boolean operators. <end> signifies the end of the expression.

The following is the postfix form of the same expression:

A B <and> C D <not> <and> <or> <end>

In the postfix form, each operator is preceded by its operand. The table below illustrates the postfix form of the four viruses in the above example.

| Virus | Signature |
| --- | --- |
| A/P1 | (MacroSig/A) (MacroSig/P1) <and> (MacroSig/P2) <not> <and> <end> |
| A/P2 | (MacroSig/A) (Macrosig/P1) <and> (MacroSig/P1) <not> <and> <end> |
| B/P1 | (MacroSig/B) (Macrosig/P1) <and> <end> |
| A/P1/P2 | (MacroSig/A) (MacroSig/P1) <and> (MacroSig/P2) <and> <end> |

Figure 4:
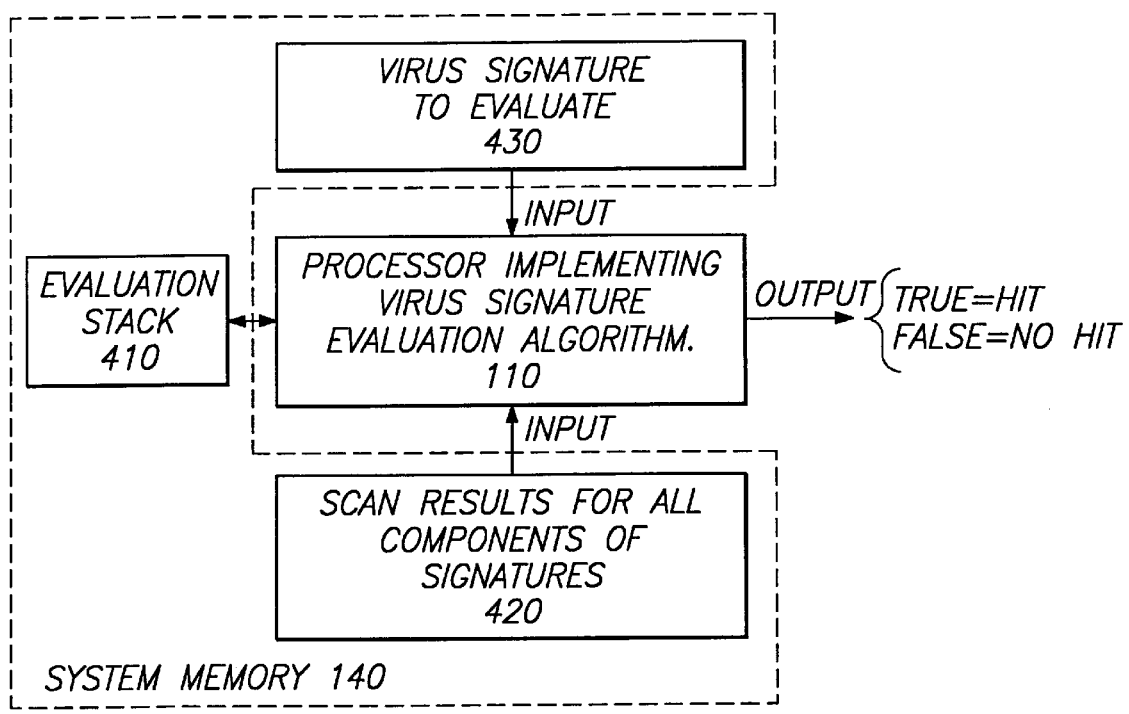
FIG. 4 illustrates information flow in the computer system 100.

FIG. 4 illustrates the information flow to and from a processor 110 utilizing the virus detection method of the present invention. To evaluate the Boolean expressions, the processor 110 retrieves from the system memory 140 the virus signature 430 to be evaluated and the scan results 420 indicating whether the components of the signature were detected in the scanned data streams. The processor 110 stores intermediate evaluation results in an evaluation stack 410, located in the system memory 140. The evaluation stack is a pushdown list, and intermediate evaluation results are pushed onto the stack 410 and retrieved from the stack 410 in a last-in-first-out (LIFO) manner.

After the evaluation of the virus signature is complete, the processor 110 outputs a signal indicating whether the virus corresponding to the signature was detected. This signal is sent to the application which requested the virus scan. Note that the processor also may be executing this application.

Figure 5:
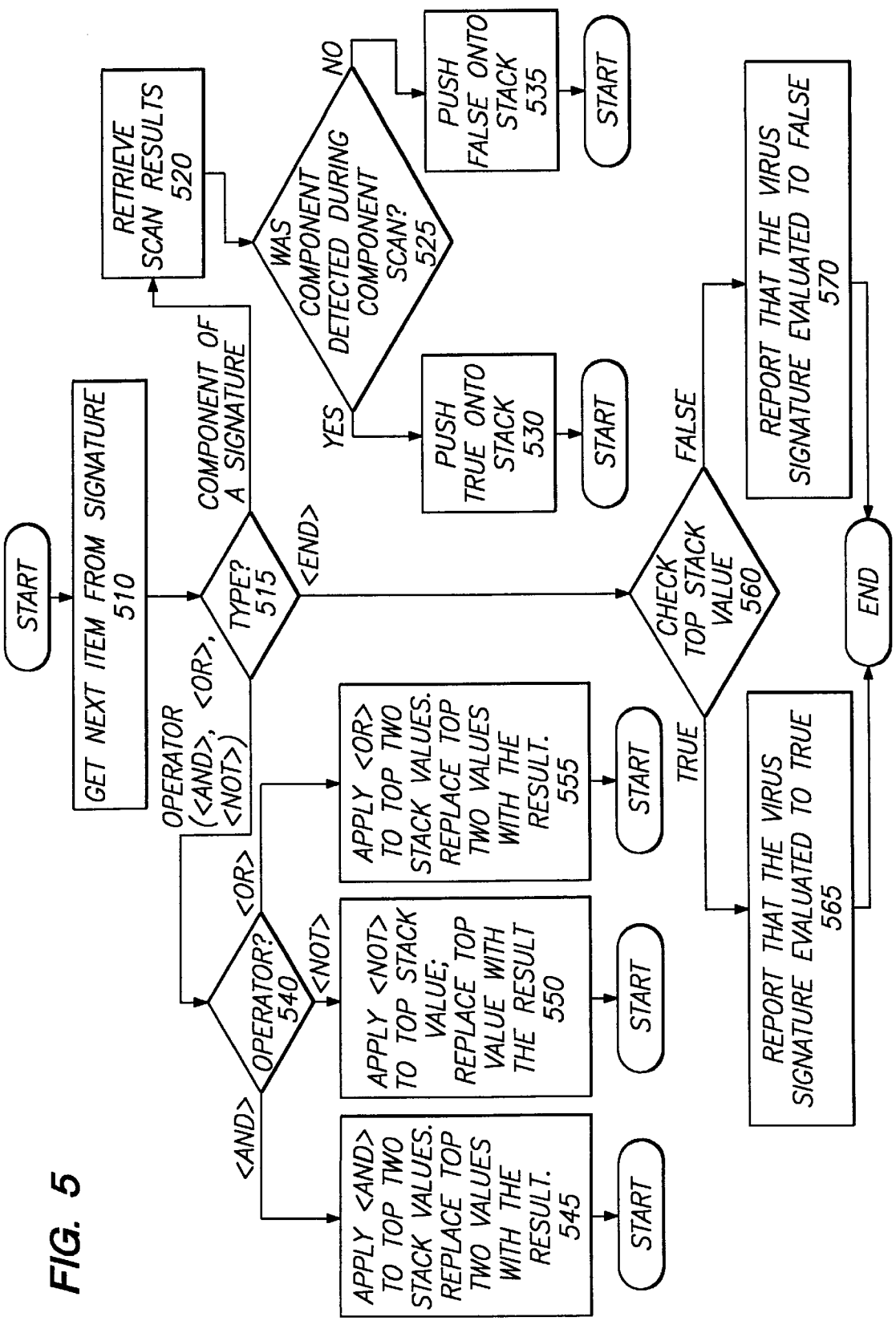
FIG. 5 illustrates a method according to the present invention for evaluating a virus signature.

FIG. 5 illustrates the method by which the processor 110 evaluates the virus signatures to determine if the Boolean expression representing the signatures is satisfied. To begin the process the processor 110 retrieves 510 from memory the first item of the virus signature. The processor 110 then determines 515 if the retrieved item is an operator, an <end>, or signature of a component. If the item is a signature of a component, the processor 110 retrieves 520 scan results for that component. The scan results indicate whether the signature of the component was found in the scanned data streams, and, from this information, the processor 110 determines 525 whether the component was detected during the virus scan. If the component was detected, the processor 110 "pushes" 530 a TRUE symbol onto the evaluation stack. TRUE is pushed onto the evaluation stack by writing a symbol of true onto the top of the evaluation stack in the system memory 140. In the preferred embodiment, TRUE and FALSE are represented by a number. For instance, "1" could signify true and "0" could signify false. If the component was not detected during the virus scan, the processor 110 pushes 535 a FALSE symbol onto the evaluation stack. After a TRUE or FALSE has been pushed onto the evaluation stack, the processor 110 returns to step 510 and retrieves the next item from the virus signature.

If at step 515, the processor 110 determines that the item retrieved is a Boolean operator (i.e. OR, AND, or NOT), the processor 110 identifies 540 which operator the item is. If the item is a Boolean AND, the processor 110 retrieves the top two evaluation stack values from the system memory 140, applies 545 a Boolean AND operation to the values, and replaces the top two values of the stack with the result of the AND operation. If the item is a Boolean NOT, the processor 110 retrieves from the system memory 140 the top value of the evaluation stack, applies 550 a Boolean NOT operation to the top value, and replaces the top value of the evaluation stack with the result of the NOT operation. If the item is a Boolean OR, the processor 110 retrieves the top two values of the evaluation stack, applies 555 the Boolean OR operation to the top two values, and replaces the top two values with the result of the OR operation. After the Boolean operation specified by the item has been performed, the processor 110 returns to step 510 and retrieves the next item from the signature.

Referring to step 515, in response to determining that the retrieve item is an END operation (i.e. <end>), the processor 110 checks 560 the top evaluation stack value. If the top stack value is a TRUE symbol (e.g. "1"), the Boolean expression representing the virus signature is satisfied, and the processor 110 reports 565, to the application requesting the virus scan, that the virus corresponding to the evaluated virus signature has been detected. Conversely, if the top stack value is false, the Boolean expression representing the virus signature is not satisfied, and the processor 110 reports 570 the virus was not detected. If there are additional virus signatures to be evaluated this process is repeated for the additional virus signatures.

The processor 110 is programmed to implement the methods illustrated in and described with respect to FIGS. 3a–3c and 5. These methods are embodied in a computer program using known programming techniques, and the processor executes the program to perform these methods. In one embodiment, the computer program is written in the C programming language.

To illustrate examples, the method illustrated in FIG. 5 will be applied to evaluate the virus signatures for viruses A/P1 and A/P1/P2.

Assume that A and P1 were detected in the scanned data streams, but P2 was not. The signature for virus A/P1 in postfix form is (Component Sig/A) (Component Sig/P1) <and> (Component Sig/P2) <not> <and> <end>. Therefore, the first item the processor 110 retrieves from the signature is Component Sig/A. Since component A was detected in the scanned data streams, the processor 110 pushes TRUE onto the evaluation stack. Assume TRUE=1 and FALSE=0. At this point the evaluation stack looks as follows:

| Evaluation Stack |
|---|
| 1 |

The next item retrieved by the processor 110 is Component Sig/P1. Since component P1 was detected in the scanned data streams, the processor 110 pushes another TRUE onto the evaluation stack, which then looks as follows:

| Evaluation Stack |
|---|
| 1 |
| 1 |

The next item of the signature retrieved is the Boolean operator AND. Therefore, the processor 110 retrieves the top two values of the evaluation stack, which are 1 and 1, and performs the Boolean AND operation on these values. The result of performing the Boolean operation AND on 1 and 1 is 1. The top two values are then replaced with the value 1, resulting in the following evaluation stack:

| Evaluation Stack |
|---|
| 1 |

The next item in the signature is Component Sig/P2. Since P2 was not detected in the scanned data streams, FALSE would be pushed onto the stack, and the stack would looks as follows:

| Evaluation Stack |
|---|
| 0 |
| 1 |

Boolean NOT is the next item in the signature. Therefore, the processor 110 applies the Boolean NOT operation to the top value in the stack, which is zero. The result of NOT (0) is 1. Thus, 1 replaces 0 as the top value in the stack and the stack looks as follows:

| Evaluation Stack |
|---|
| 1 |
| 1 |

Boolean AND is the next item of the signature, and, consequently, the AND operation is performed on the top two values of the stack, 1 and 1. The result is 1, which replaces the top two values, and the stack looks as follows:

| Evaluation Stack |
|---|
| 1 |

The next item of the signatures is an <END>. Therefore, the processor 110 checks the top value in the stack. Since the top value in the stack is 1, which represents TRUE, the processor 110 reports that the virus A/P1 has been detected.

With respect to virus A/P1/P2, the postfix for the signature is (Component Sig/A)(Component Sig/P1) <and> (Component Sig/P2) <and> <end>. Since the first three items of this signature are the same as the signature for virus A/P1, we know the evaluation stack after the first three items are evaluated is as follows:

| Evaluation Stack |
|---|
| 1 |

The fourth item is Component Sig/P2. Since P2 was not found in the scanned viruses, the processor 110 would push FALSE onto the evaluation stack, which now looks as follows:

| Evaluation Stack |
|---|
| 0 |
| 1 |

Boolean AND is the next item, and, thus, the processor 110 performs an AND operation on 0 and 1. The result is 0, which replaces the top two values in the stack. The stack now is as follows:

| Evaluation Stack |
|---|
| 0 |

The next item of the signature is <end>. The processor 110 checks the top value in the stack, and, because it is zero, the processor 110 reports that the virus A/P1/P2 was not found in the scanned data streams.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

What is claimed is:

1. A method for detecting a computer virus, the method comprising:

identifying a plurality of data streams to be scanned;

scanning the plurality of data streams to detect the presence of components of the computer virus;

producing a scan result indicating which of the components of the computer virus were detected;

evaluating a Boolean expression representing the computer virus to determine whether the scan result satisfies the Boolean expression; and in response to the Boolean expression being satisfied, determining that the computer virus exists in the plurality of data streams.

2. The method of claim 1, further comprising:

in response to the Boolean expression not being satisfied, determining that the computer virus does not exist in the plurality of data streams.

3. The method of claim 1, wherein the Boolean expression includes an operand which is a signature of one of the components.

4. The method of claim 1, wherein the Boolean expression includes operands selectively combined by Boolean operators, each of the operands being a signature of a different one of the components.

5. The method of claim 1, wherein the Boolean expression includes at least one operand, wherein each operand is a signature of a different one of the components, and wherein, in response to there being more than one operand, the Boolean expression includes at least one Boolean operator to selectively combine the operands.

6. The method of claim 5, wherein the step of evaluating a Boolean expression includes performing a Boolean operation, specified by the Boolean operator, on at least one operand.

7. The method of claim 5, wherein the step of evaluating a Boolean expression comprises:

(a) identifying a first operand from the Boolean expression;

(b) determining whether the first operand was detected during the scanning step;

(c) in response to the first operand being detected during the scanning step, pushing a true indication onto an evaluation stack;

(d) in response to the first operand not being detected during the scanning step, pushing a false indication onto the evaluation stack;

(e) determining whether a next item in the Boolean expression is an operand, a Boolean operator or an end indication;

(f) in response to the next item being an operand, repeat steps (b) through (d) using the next item instead of the first operand;

(g) in response to the next item being a Boolean AND operator, performing a Boolean AND operation on the top two values of the evaluation stack;

(h) in response to the next item being a Boolean OR operation, performing a Boolean OR operation on the top two values of the evaluation stack;

(i) in response to the next item being a Boolean NOT operation, performing a Boolean NOT operation on the top value of the evaluation stack;

(j) in response to having performed a Boolean operation in steps (g), (h) or (i), returning to step (e);

(k) in response to the next item being the end indication, checking the top value of the evaluation stack;

(l) in response top value being a TRUE indication, determining that the Boolean expression is satisfied; and (m) in response to the top value being a FALSE indication, determining that the Boolean expression is not satisfied.

8. A computer program embodied in a tangible medium and capable of being read by a computer for performing the method of claim 1.

9. A method for detecting a computer virus, the method comprising:

scanning a plurality of data streams to detect the presence of components of the computer virus;

producing a scan result indicating which of the components of the computer virus were detected;

evaluating a Boolean expression representing the computer virus to determine whether the scan result satisfies the Boolean expression, wherein the Boolean expression includes an indication of an absence of a component not present in the computer virus and wherein evaluating the Boolean expression includes determining whether the component not present in the computer virus was detected during the scanning step; and in response to the Boolean expression being satisfied, determining that the computer virus exists in the plurality of data streams.

10. A method for creating a signature of a computer virus, the method comprising:

dividing a computer virus into at least two components;

creating a signature for each of a select number of the components;

selectively combining the signatures of the select components to create the signature of the computer virus;

identifying a component not present in the computer virus but present in another computer virus;

creating an indication of an absence of the component not present in the computer virus but present in another computer virus; and adding the indication of the absence to the virus signature.

11. The method of claim 10, wherein the signature of the computer virus is in the form of a Boolean expression and wherein the operands of the Boolean expression are the signatures of the select components.

12. The method of claim 10, wherein the computer virus spans at least two data streams and wherein each component spans a different data stream.

13. The method of claim 10, further comprising:

scanning a plurality of data streams to detect the presence of the select components;

producing a scan result indicating which of the select components were detected;

evaluating the virus signature to determine whether the scan results satisfy the virus signature; and determining that the computer virus exists in response to the scan results satisfying the virus signature.

14. A method for creating a signature of a computer virus, the method comprising:

dividing the computer virus into at least two components;

determining whether one of the components is unique to the computer virus with respect to other computer viruses;

in response to determining that one of the components is unique to the computer virus with respect to other computer viruses, determining whether the probability is low that the unique component will exist without the computer virus existing;

in response to determining that the probability is low, creating a signature for the unique component; and in response to determining that the probability is low and in response to creating a signature for the unique component, using the signature of the unique component as the signature for the computer virus.

15. The method of claim 14 wherein, in response to determining that the probability is not low, the method further comprises:

creating a signature for the unique component and a signature for another one of the components; and selectively combining the signature of the unique component and the signatures of the other component to create the signature of the computer virus.

16. The method of claim 14 further comprising:

in response to determining that there is not a component unique to the computer virus with respect to other computer viruses, determining whether there is a combination of at least two of the components that is unique to the computer virus with respect to other computer viruses;

in response to determining that there is a combination of at least two of the components that is unique to the computer virus with respect to other computer viruses, determining whether the probability is low that the combination will exist without the computer virus existing;

in response to determining that the probability is low, creating a signature for each of the components in the combination; and in response to creating a signature for each of the components in the combination, combining the signatures to create the signature of the computer virus.

17. The method of claim 16, wherein, in response to determining that the probability is not low, the method further comprises:

expanding the combination by adding other ones of the components to the combination until the probability is low that the combination exists without the computer virus existing;

creating a signature for each of the components of the of the expanded combination; and selectively combining the signatures of each of the components of the expanded combination to create a signature for the computer virus.

18. The method according to claim 16 wherein the components of the computer virus form a set of components and wherein the method further comprises:

in response to there not being a combination of at least two of the components that is unique to the computer virus with respect to other computer viruses, creating a signature for the computer virus that represents a combination of signatures of each of the components of the computer virus and that indicates a component which is not part of the computer virus, the component that is not part of the computer virus being part of another computer virus that has a set of components which is a superset of the set of components in the computer virus.

* * * * *

UNITED STATES PATENT AND TRADEMARK OFFICE
CERTIFICATE OF CORRECTION

PATENT NO. : 6,006,329

DATED : December 21, 1999

INVENTOR(S) : Darren Chi

It is certified that error appears in the above-identified patent and that said Letters Patent is hereby corrected as shown below:

Claim 17, Column 14, line 2, after "components" delete the second occurrence of "of the".

Signed and Sealed this

Fifth Day of December, 2000

Attest:

Attesting Officer

Q. TODD DICKINSON

Director of Patents and Trademarks